United States Patent

Kumar et al.

(10) Patent No.: US 11,397,539 B2
(45) Date of Patent: Jul. 26, 2022

(54) DISTRIBUTED BACKUP USING LOCAL ACCESS

(71) Applicant: EMC IP Holding Company LLC, Hopkinton, MA (US)

(72) Inventors: Sunil Kumar, Bangalore (IN); Krishna Deepak Nuthakki, Bangalore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/106,511

(22) Filed: Nov. 30, 2020

(65) Prior Publication Data

US 2022/0171535 A1 Jun. 2, 2022

(51) Int. Cl.
*G06F 3/06* (2006.01)
*G06F 11/14* (2006.01)

(52) U.S. Cl.
CPC ............ *G06F 3/065* (2013.01); *G06F 3/0604* (2013.01); *G06F 3/0664* (2013.01);
(Continued)

(58) Field of Classification Search
CPC ...... G06F 3/067; G06F 3/0647; G06F 3/0665; G06F 3/0689; G06F 3/0605; G06F 3/065;
(Continued)

(56) References Cited

U.S. PATENT DOCUMENTS 6,567,397 B1 5/2003 Campana et al.
6,687,746 B1 2/2004 Shuster et al.
(Continued)

FOREIGN PATENT DOCUMENTS

CN 103677927 B 2/2017
EP 1117028 A2 7/2001
(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Reginald G Bragdon
*Assistant Examiner* — Thanh D Vo
(74) *Attorney, Agent, or Firm* — Ryan, Mason & Lewis, LLP

(57) ABSTRACT

An apparatus comprises at least one processing device comprising a processor and a memory. The at least one processing device is configured to provision a first logical device on a first storage system, to configure the first logical device to support replication from the first storage system to a second storage system, and to initiate generation of a remote backup copy of a second logical device on the second storage system. In conjunction with performance of a verification process for the remote backup copy of the second logical device, the at least one processing device is configured to cause the first logical device to be paired with the remote backup copy of the second logical device, and to mount the first logical device so as to permit performance of the verification process for the remote backup copy utilizing data obtained from the remote backup copy via the first logical device.

20 Claims, 4 Drawing Sheets

(52) U.S. Cl.
CPC ........ *G06F 3/0683* (2013.01); *G06F 11/1451* (2013.01); *G06F 11/1464* (2013.01); *G06F 2201/84* (2013.01)

(58) Field of Classification Search
CPC .. G06F 3/0617; G06F 2201/84; G06F 3/0614; G06F 3/0646
See application file for complete search history.

(56) References Cited

U.S. PATENT DOCUMENTS

| | | | |
|---|---|---|---|
| 6,697,875 B1 | 2/2004 | Wilson | |
| 7,275,103 B1 | 9/2007 | Thrasher et al. | |
| 7,454,437 B1 | 11/2008 | Lavallee et al. | |
| 7,577,957 B1* | 8/2009 | Kamvysselis | G06F 11/1612 707/999.202 |
| 7,617,292 B2 | 11/2009 | Moore et al. | |
| 7,668,981 B1 | 2/2010 | Nagineni et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,250,256 B2 | 8/2012 | Ghosalkar et al. | |
| 8,285,825 B1 | 10/2012 | Nagaraj et al. | |
| 8,825,919 B1 | 9/2014 | Lim et al. | |
| 8,832,334 B2 | 9/2014 | Okita | |
| 8,874,746 B1 | 10/2014 | Gonzalez | |
| 9,026,694 B1 | 5/2015 | Davidson et al. | |
| 9,201,803 B1 | 12/2015 | Derbeko et al. | |
| 9,400,611 B1 | 7/2016 | Raizen | |
| 9,430,368 B1 | 8/2016 | Derbeko et al. | |
| 9,594,780 B1 | 3/2017 | Esposito et al. | |
| 9,647,933 B1 | 5/2017 | Tawri et al. | |
| 9,672,160 B1 | 6/2017 | Derbeko et al. | |
| 9,778,852 B1 | 10/2017 | Marshak et al. | |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1 | 11/2019 | Rao et al. | |
| 10,521,369 B1 | 12/2019 | Mallick et al. | |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 10,754,572 B2 | 8/2020 | Kumar et al. | |
| 10,757,189 B2 | 8/2020 | Mallick et al. | |
| 10,764,371 B2 | 9/2020 | Rao et al. | |
| 10,789,006 B1 | 9/2020 | Gokam et al. | |
| 10,817,181 B2 | 10/2020 | Mallick et al. | |
| 10,838,648 B2 | 11/2020 | Sharma et al. | |
| 2002/0023151 A1 | 2/2002 | Iwatani | |
| 2002/0103923 A1 | 8/2002 | Cherian et al. | |
| 2004/0010563 A1 | 1/2004 | Forte et al. | |
| 2006/0026346 A1 | 2/2006 | Kadoiri et al. | |
| 2006/0277383 A1 | 12/2006 | Hayden et al. | |
| 2007/0174849 A1 | 7/2007 | Cheung et al. | |
| 2008/0043973 A1 | 2/2008 | Lai et al. | |
| 2008/0201458 A1 | 8/2008 | Salli | |
| 2008/0301332 A1 | 12/2008 | Butler et al. | |
| 2009/0259749 A1 | 10/2009 | Barrett et al. | |
| 2010/0313063 A1 | 12/2010 | Venkataraja et al. | |
| 2011/0197027 A1 | 8/2011 | Balasubramanian et al. | |
| 2011/0296230 A1 | 12/2011 | Chen et al. | |
| 2012/0102369 A1 | 4/2012 | Hiltunen et al. | |
| 2012/0246345 A1 | 9/2012 | Contreras et al. | |
| 2013/0117766 A1 | 5/2013 | Bax et al. | |
| 2013/0339551 A1 | 12/2013 | Flanagan et al. | |
| 2014/0105068 A1 | 4/2014 | Xu | |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0117113 A1 | 4/2016 | Li et al. | |
| 2016/0335003 A1 | 11/2016 | Ahmed et al. | |
| 2017/0017403 A1* | 1/2017 | Sekine | G06F 3/067 |
| 2017/0024232 A1* | 1/2017 | Barve | G06F 3/0689 |
| 2017/0235507 A1 | 8/2017 | Sinha et al. | |
| 2018/0189635 A1 | 7/2018 | Olarig et al. | |
| 2018/0253256 A1 | 9/2018 | Bharadwaj | |
| 2018/0317101 A1 | 11/2018 | Koue | |
| 2019/0065064 A1* | 2/2019 | Jin | G06F 3/067 |
| 2019/0095299 A1 | 3/2019 | Liu et al. | |
| 2019/0108888 A1 | 4/2019 | Sarkar et al. | |
| 2019/0179771 A1* | 6/2019 | Ward | G06F 3/0683 |
| 2019/0334987 A1 | 10/2019 | Mallick et al. | |
| 2020/0021653 A1 | 1/2020 | Rao et al. | |
| 2020/0097203 A1 | 3/2020 | Mallick et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |
| 2020/0192588 A1 | 6/2020 | Kumar et al. | |
| 2020/0204475 A1 | 6/2020 | Mallick et al. | |
| 2020/0204495 A1 | 6/2020 | Mallick et al. | |
| 2020/0213274 A1 | 7/2020 | Pusalkar et al. | |
| 2020/0241890 A1 | 7/2020 | Mallick et al. | |
| 2020/0314218 A1 | 10/2020 | Kumar et al. | |
| 2020/0348860 A1 | 11/2020 | Mallick et al. | |
| 2020/0348861 A1 | 11/2020 | Marappan et al. | |
| 2020/0348869 A1 | 11/2020 | Gokam | |
| 2020/0349094 A1 | 11/2020 | Smith et al. | |
| 2020/0363985 A1 | 11/2020 | Gokam et al. | |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.
Vmware, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
Dell EMC, "PowerMax OS," Dell EMC PowerMax Family Product Guide, May 2019, 192 pages.
Dell EMC, "Dell EMC SC Series Storage and Microsoft Multipath I/O," CML 1004, Jul. 2018, 36 pages.
Vmware, Inc. "VMware VMFS Volume Management," 2009, 8 pages.
Dell EMC, "Dell EMC Unity: Virtualization Integration," Technical White Paper, Oct. 2019, 39 pages.
Dell EMC, "Dell EMC PowerMax: iSCSI Implementation for Dell EMC Storage Arrays Running PowerMaxOS," Technical White Paper, Sep. 2019, 35 pages.
U.S. Appl. No. 16/697,393 filed in the name of Vinay G. Rao et al. filed Nov. 27, 2019, and entitled "Automated Seamless Migration of Logical Storage Devices."
U.S. Appl. No. 16/710,828 filed in the name of Amit Pundalik Anchi et al. filed Dec. 11, 2019, and entitled "Automated Seamless Migration with Signature Issue Resolution."
U.S. Appl. No. 17/074,818 filed in the name of Sunil Kumar et al. filed Oct. 20, 2020, and entitled "Creating Remote Backup Copies in Asynchronous Replication Arrangements Involving Relatively Long Cycle Times."

* cited by examiner

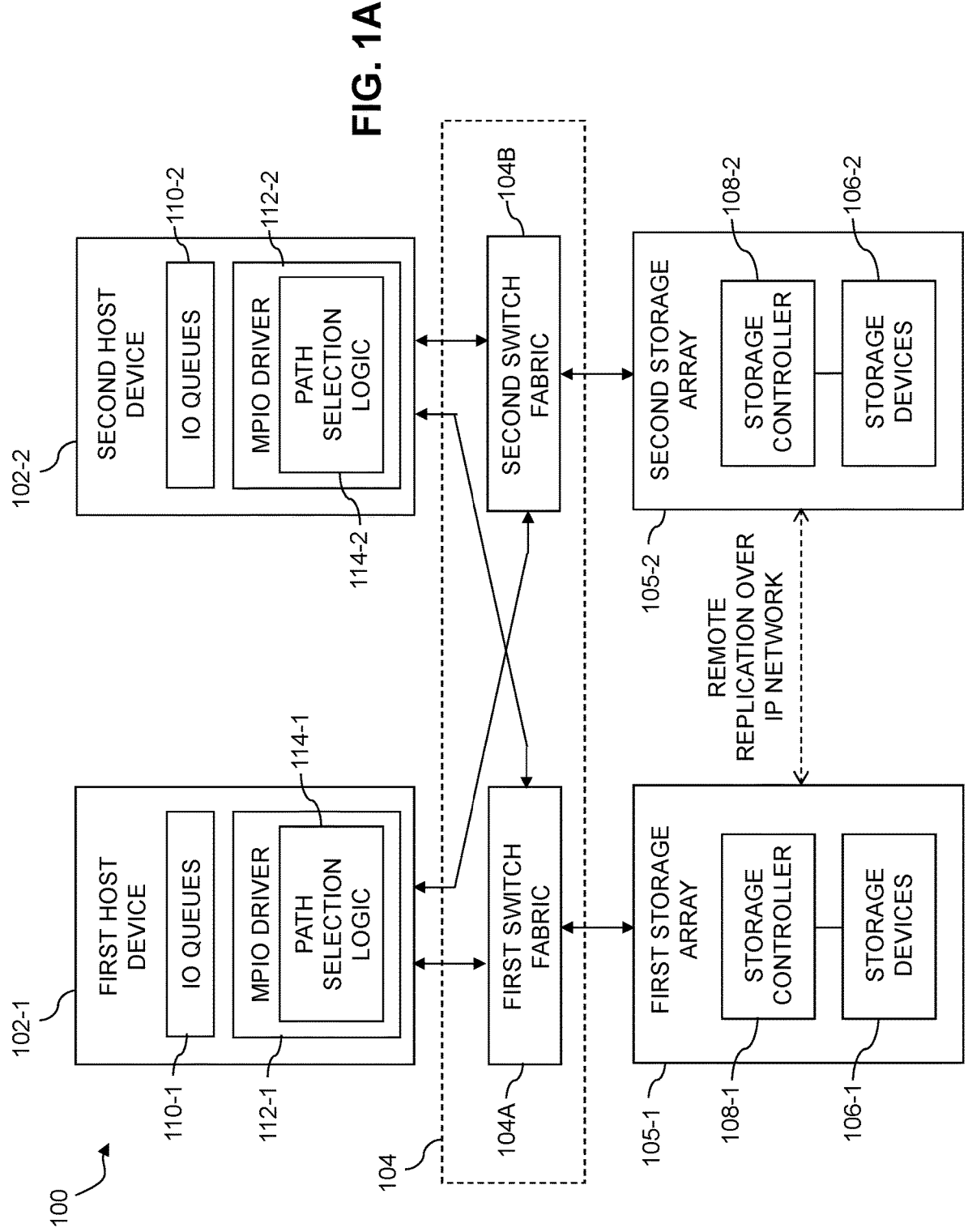

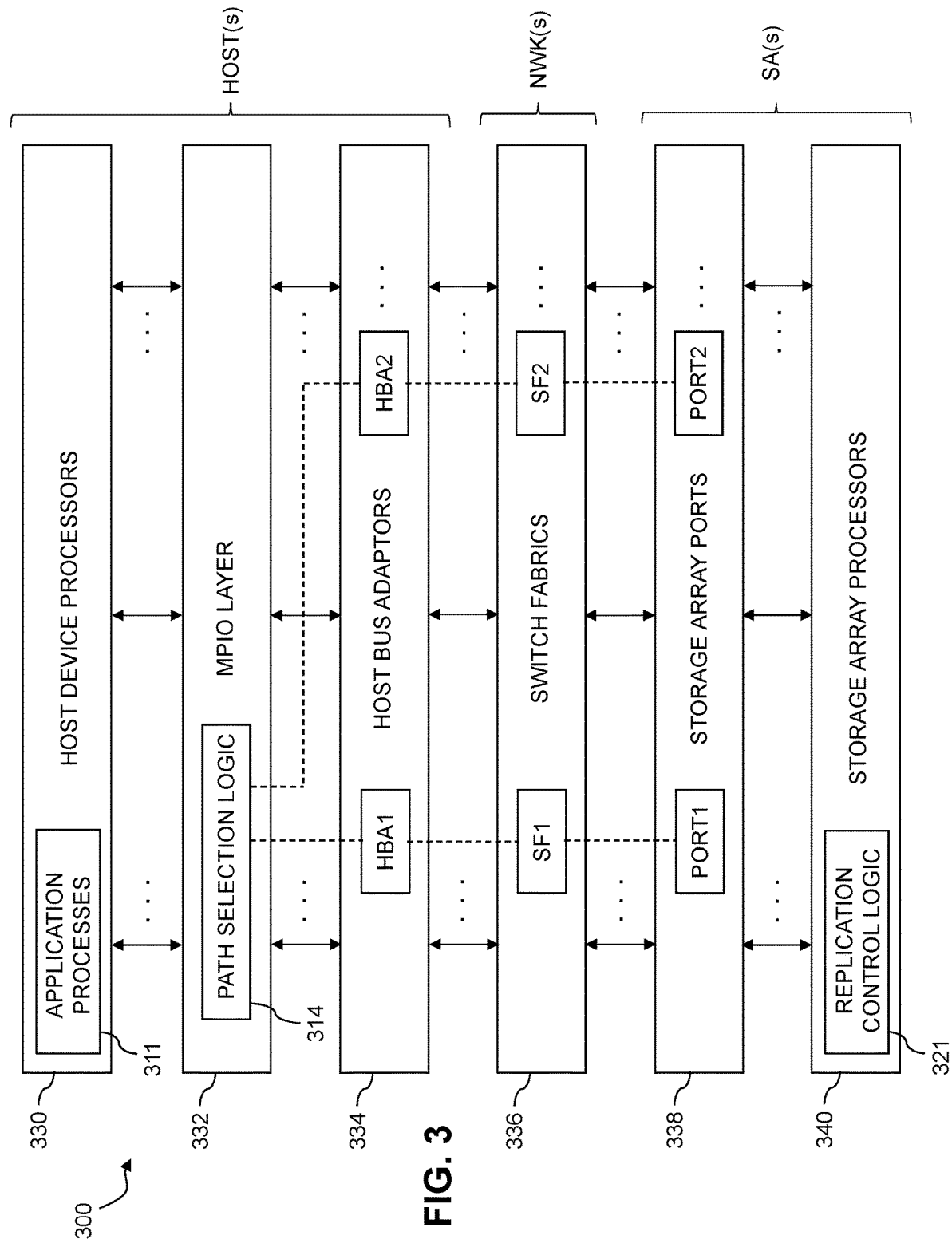

DISTRIBUTED BACKUP USING LOCAL ACCESS

FIELD

The field relates generally to information processing systems, and more particularly to storage in information processing systems.

BACKGROUND

Many information processing systems are configured to replicate data from one storage system to another storage system, possibly at different physical sites. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business.

Data replication in these and other contexts can be implemented using asynchronous replication at certain times and synchronous replication at other times. For example, asynchronous replication may be configured to periodically transfer data in multiple cycles from a source site to a target site, while synchronous replication may be configured to mirror host writes from the source site to the target site as the writes are made at the source site. Storage systems participating in a replication process can therefore each be configured to support both asynchronous and synchronous replication modes.

Conventional approaches to data replication can be problematic under certain conditions. For example, it can sometimes be difficult to verify the correctness of remote backup copies of one or more storage volumes, particularly in those situations in which a local storage array does not itself have a corresponding local copy suitable for use in a verification process performed by a verification tool executing on a local host device.

SUMMARY

Illustrative embodiments provide techniques for distributed backup using local access. For example, some embodiments can allow a remote backup copy on a remote storage array to be verified from a local storage array even in cases in which the local storage array does not itself have a local copy available. The local and remote storage arrays are examples of what are more generally referred to herein as local and remote storage systems, or first and second storage systems.

The remote backup copy illustratively comprises a snapshot or other type of remote copy of at least one logical storage volume or other type of logical storage device utilized by a database application or other type of application running on one or more host devices.

The local and remote storage systems are illustratively implemented as in the form of distributed storage arrays having respective sets of distributed storage nodes, and may comprise content addressable storage systems, although a wide variety of other types of storage systems can be used in other embodiments. The local and remote storage systems illustratively interact with multiple host devices over one or more networks, such as one or more storage area networks (SANs).

In one embodiment, an apparatus comprises at least one processing device that includes a processor and a memory, with the processor being coupled to the memory. The at least one processing device is configured to provision a first logical device on a first storage system, to configure the first logical device to support replication from the first storage system to a second storage system, and to initiate generation of a remote backup copy of a second logical device on the second storage system. In conjunction with performance of a verification process for the remote backup copy of the second logical device, the at least one processing device causes the first logical device to be paired with the remote backup copy of the second logical device, and mounts the first logical device so as to permit performance of the verification process for the remote backup copy utilizing data obtained from the remote backup copy via the first logical device.

The at least one processing device in some embodiments comprises, for example, at least a portion of a host device coupled to one or both of the first and second storage systems via at least one network.

In some embodiments, the first and second storage systems comprise, for example, respective distinct storage arrays at respective different physical sites. Numerous alternative storage system arrangements are possible.

In some embodiments, provisioning the first logical device on the first storage system illustratively comprises provisioning the first logical device as a storage-less logical device without associated physical storage on the first storage system.

Additionally or alternatively, configuring the first logical device to support replication from the first storage system to a second storage system illustratively comprises configuring the first logical device to include remote replication capabilities.

In some embodiments, initiating generation of a remote backup copy of the second logical device on the second storage system illustratively comprises causing a snapshot of the second logical device to be taken on the second storage system.

The verification process in some embodiments is performed by a verification tool implemented on the host device. The verification process performed by the verification tool implemented on the host device illustratively comprises confirming that the remote backup copy is a valid copy by verifying that the remote backup copy is at least one of restartable and consistent. Advantageously, the verification process performed by the verification tool implemented on the host device does not require copying all of the data of the remote backup copy from the second storage system to the first storage system.

In some embodiments, causing the first logical device to be paired with the remote backup copy of the second logical device illustratively comprises creating a remote data facility pairing between the first logical device and the remote backup copy utilizing remote replication capabilities of the first logical device.

The first and second logical devices in some embodiments are associated with a particular type of application executing on the host device, such as a database application.

At least a subset of the above-noted operations such as provisioning the first logical device, configuring the first logical device to support replication, initiating generation of the remote backup copy, causing the first logical device to be paired with the remote backup copy, and mounting the first logical device are illustratively performed by or under the control of a backup application running on the host device.

In some embodiments, the backup application interacts with a database application utilizing one or more application programming interfaces (APIs) configured in accordance with at least one of a Virtual Device Interface (VDI) and a Volume Shadow Copy Service (VSS) configuration, although numerous other interaction arrangements are possible.

These and other illustrative embodiments include, without limitation, apparatus, systems, methods and computer program products comprising processor-readable storage media.

BRIEF DESCRIPTION OF THE DRAWINGS

FIGS. 1A and 1B are block diagrams of example information processing systems configured with functionality for distributed backup using local access in an illustrative embodiment.

FIG. 3 is a block diagram showing multiple layers of a layered system architecture configured with functionality for distributed backup using local access in an illustrative embodiment.

DETAILED DESCRIPTION

Figure 1B:
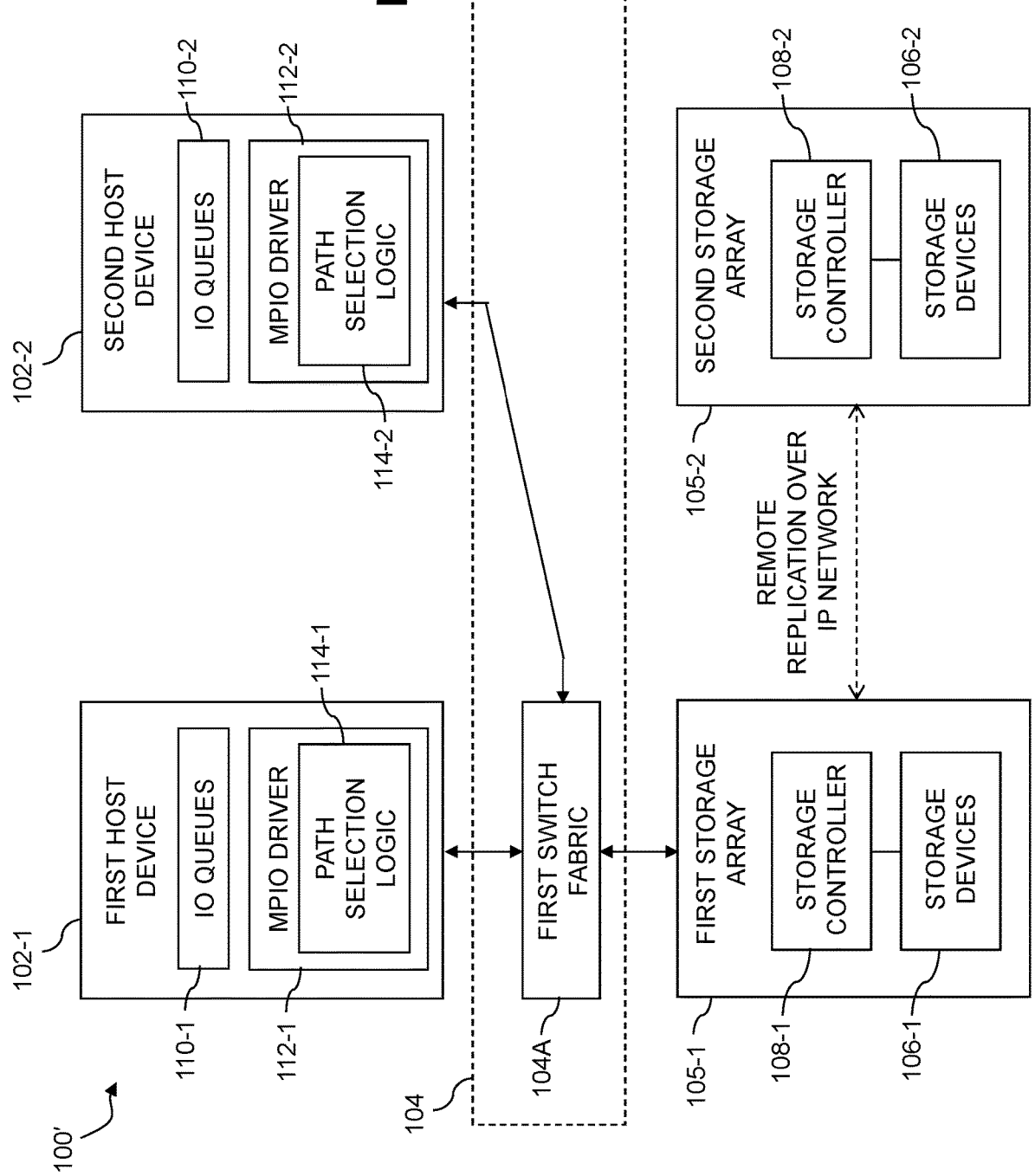

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

FIG. 1A shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises at least first and second switch fabrics 104A and 104B. The host devices 102 communicate over the network 104 via switch fabrics 104A and 104B with at least first and second storage arrays 105-1 and 105-2, collectively referred to herein as storage arrays 105. For example, the network 104 illustratively comprises at least one storage area network (SAN) and the fabrics 104A and 104B illustratively comprise respective distinct switch fabrics of a set of multiple switch fabrics interconnecting the host devices 102 with the storage arrays 105 over the one or more SANs. Each of the fabrics 104A and 104B in some embodiments is associated with a different SAN.

The system 100 is configured such that the first host device 102-1 communicates with the first storage array 105-1 over the first switch fabric 104A and communicates with the second storage array 105-2 over the second switch fabric 104B. Similarly, the second host device 102-2 communicates with the first storage array 105-1 over the first switch fabric 104A and communicates with the second storage array 105-2 over the second switch fabric 104B. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102, two switch fabrics 104A and 104B and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 105 illustratively comprises one or more VNX®, VMAX®, Unity™ or PowerMax™ storage arrays, commercially available from Dell Technologies.

As another example, one or both of the storage arrays 105 may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Small Computer System Interface (SCSI), Internet SCSI (iSCSI), Serial Attached SCSI (SAS) and Serial Advanced Technology Attachment (SATA). Numerous other interfaces and associated communication protocols can be used in other embodiments.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104.

Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by the host device 102-1 to one of the storage arrays 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes. Logical storage devices are also referred to herein as simply "logical devices."

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1A embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage arrays 105-1 and 105-2 are illustratively configured to participate in a remote replication process, such as cycle-based asynchronous replication. In accordance with the cycle-based asynchronous replication, a consistency group comprising one or more logical storage volumes or other logical storage devices is replicated from the first storage array 105-1 to the second storage array 105-2 over a plurality of asynchronous replication cycles.

Such data replication across the multiple storage arrays 105 can be used to facilitate failure recovery in the system 100. For example, the first storage array 105-1 may operate as a production storage array relative to the second storage array 105-2 which operates as a backup or recovery storage array.

In some embodiments, the cycle-based asynchronous replication comprises an asynchronous replication mode of a replication process that includes both synchronous and asynchronous replication modes, with dynamic switching between the synchronous and asynchronous replication modes.

A synchronous replication mode may involve utilization of an active-active configuration for the storage arrays 105, although other storage configurations can be used in other embodiments. In an example of an active-active configuration that may be used, data stored in one of the storage arrays 105 is replicated to the other one of the storage arrays 105 utilizing synchronous replication. Examples of active-active configurations include "metro" or "stretched" high availability storage array configurations. The term "active-active configuration" as used herein is therefore intended to be broadly construed.

In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

The synchronous replication process is therefore configured to mirror data writes from one or more of the host devices 102 to both of the storage arrays 105.

The storage arrays 105-1 and 105-2 are therefore assumed to be configured to participate in a replication process that includes at least one of asynchronous replication and synchronous replication. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

It is assumed that the storage controllers 108 of the respective storage arrays 105 each comprise replication control logic and a snapshot generator. The replication control logic illustratively controls performance of the above-noted asynchronous and/or synchronous replication process, or other replication processes in other embodiments. The snapshot generator is used to generate snapshots of one or more storage volumes that are subject to asynchronous and/or synchronous replication, possibly in conjunction with active-active storage clustering or other types of remote replication. Again, other types of storage configurations can be used in other embodiments.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

Such snapshots are considered to be examples of what are more generally referred to herein as "copies." For example, a "remote backup copy" of a consistency group as that term is broadly used herein can comprise a snapshot of the consistency group as captured by a snapshot generator of a remote storage system. The consistency group illustratively comprises at least one storage volume or other logical storage device.

A given storage volume designated for replication between storage arrays 105 in the system 100 illustratively comprises a set of one or more LUNs or other storage volumes of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides automated path selection functionality using respective instances of path selection logic 114-1 and 114-2 implemented within the MPIO drivers 112. The MPIO drivers 112 may comprise, for example, PowerPath® drivers from Dell Technologies, or other types of MPIO drivers from other driver vendors.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of one of the storage arrays 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

Other host device components can additionally or alternatively perform at least portions of controlling delivery of IO operations over selected paths, such as one or more host device processors or other control logic instances. Illustrative embodiments are therefore not limited to arrangements in which MPIO drivers perform such delivery control functions for IO operations. Moreover, terms such as "controlling delivery" of an IO operation as used herein are intended to be broadly construed so as to encompass, for example, selecting from a plurality of paths a particular path over which a particular IO operation is to be sent to one of the storage arrays 105, and sending the IO operation over that path.

In the FIG. 1A embodiment, the network 104 comprises first and second switch fabrics 104A and 104B through which the first and second host devices 102-1 and 102-2 are cross-connected to the first and second storage arrays 105-1 and 105-2 as shown. This example cross-connected arrangement supports active-active configuration of the storage arrays 105 for the multiple host devices 102, although other replication arrangements can be used in other embodiments. Such replication arrangements illustratively utilize an IP network, although additional or alternative networks can be used.

FIG. 1B shows one possible alternative configuration of system 100. In this embodiment, an information processing system 100' is configured in a manner similar to that previously described for system 100, but the second storage array 105-2 does not have a direct connection via SAN 104 to either of the first and second host device 102. Instead, the second storage array 105-2 is configured for remote replication relative to the first storage array 105-1 without having direct connections to the host devices 102. Such remote replication illustratively occurs over an IP network in the FIG. 1B embodiment, although, as noted above, other types of networks can be used.

As indicated previously, storage arrays 105 participating in a given replication process can be configured to support an asynchronous replication mode, a synchronous replication mode, or both asynchronous and synchronous replication modes.

In remote replication environments (e.g., synchronous replication and/or asynchronous replication), the host sends a given write command to one storage array (referred to as the "local" storage array), and that storage array forwards the data to the other storage array (referred to as the "remote" storage array) in accordance with a selected remote replication policy. The local storage array is therefore defined as the storage array which receives the given write command from the host, and the remote storage array is defined as the storage array which is being updated by the local array.

In general, each of the storage arrays can serve different roles for different write commands sent from different hosts, possibly even for the same logical storage device, but each specific write command may be sent from a host to only one of the storage arrays.

For example, in an active-active arrangement with synchronous replication, each storage array may serve as both "local" and "remote" for a given logical storage device but for a given write command only one of the storage arrays (i.e., the storage array that received the given write command from the host) is the local array and the other is the remote array.

For asynchronous replication, one of the storage arrays is the local or source storage array and the other storage array is the remote or target storage array. For example, the local storage array is illustratively a production storage array and the remote storage array is a "remote mirror" of the production storage array, utilized to support disaster recovery.

Some embodiments utilize a Symmetrix Remote Data Facility (SRDF) arrangement to perform replication, although other replication arrangements can be used. SRDF includes multiple distinct replication modes, including SRDF/Synchronous (SRDF/S) and SRDF/Asynchronous (SRDF/A).

The source and target storage arrays in the SRDF context are referred to as R1 and R2, respectively. The logical storage devices of the source storage array are referred to as R1 devices and the logical storage devices of the target storage array are referred to as R2 devices.

SRDF/S is the synchronous mode of SRDF, and maintains a real-time (synchronous) mirrored copy of production data (R1 devices) at a physically separated target storage array (R2 devices).

SRDF/A is the asynchronous mode of SRDF, and mirrors data from the R1 devices while maintaining a dependent-write consistent copy of the data on the R2 devices at all times. The copy of the data at the secondary site is typically only seconds behind the primary site.

SRDF may be viewed as an example of what is more generally referred to herein as RDF, for remote data facility.

The above-noted synchronous and asynchronous modes of operation can be changed dynamically, and modes of operation can be specified on device level. Other types of replication arrangements can be used in other embodiments.

In some circumstances, creating a backup copy on a remote mirror of an asynchronous replication (e.g., generating a snapshot on SRDF/A R2) is not possible in cases where the time it takes the storage array to create such a remote copy is longer than the database freeze time. One such case is for SQL databases, where the backup software is using a VDI/VSS combination, resulting in a maximum SQL database freeze time of 10 seconds. Here, VDI denotes Virtual Device Interface and VSS denotes Volume Shadow Copy Service. Other types of backup software can be used in other embodiments. Such backup software is an example of what is more generally referred to herein as a "backup application" running on at least one host device. The backup application is illustratively configured to interface with the database application in conjunction with creation of backup copies.

Illustrative embodiments herein overcome drawbacks of conventional arrangements by providing techniques that facilitate the creation and verification of remote backup copies without requiring execution of database applications and associated verification tools on remote host devices, and therefore with reduced cost and complexity. For example, such techniques advantageously allow creation of consistent remote backup copies of a database or other type of application running on a local host device.

In the embodiments of FIGS. 1A and 1B, the remote replication illustratively involves asynchronous replication between the first storage array 105-1 at a local source site and the second storage array 105-2 at a remote target site. In these and numerous other remote replication arrangements, the disclosed techniques can advantageously facilitate the creation of remote backup copies in the second storage array 105-2, without requiring execution of a database application and its associated verification tool on the second host device 102-2.

The term "remote replication" as used herein is intended to be broadly construed, so as to encompass a wide variety of arrangements involving at least one of synchronous replication and asynchronous replication between source and target storage arrays or other types of storage systems.

Example distributed backup techniques will be described in further detail below with reference to a particular one of the host devices 102, namely host device 102-1 comprising MPIO driver 112-1, interacting with the first storage array 105-1, using either the cross-connected arrangement of FIG. 1A or the alternative arrangement of FIG. 1B.

The host device 102-1 via its MPIO driver 112-1 sends write requests to the first storage array 105-1, where the first storage array 105-1 is configured to participate in a replication process in which data associated with the write requests is replicated from the first storage array 105-1 to the second storage array 105-2 that is separate from the first storage array 105-1. For example, the first and second storage arrays 105 may comprise respective distinct production and recovery storage arrays at respective different physical sites, such that the first and second storage arrays 105 are physically separate and remote from one another. Additionally or alternatively, the first and second storage arrays 105 may be arranged in an active-active configuration relative to one another. The write requests are examples of what are also referred to herein as IO operations. Such IO operations are illustratively sent from the host device 102-1 to a given one of the storage arrays 105 utilizing commands of a particular storage protocol, such as a SCSI protocol or an NVMe protocol. The write requests are therefore also referred to herein as write commands.

In some embodiments, MPIO drivers 112 of the host devices 102 illustratively have connectivity to an MPIO management station, such as a PowerPath® Management Appliance (PPMA) or other type of centralized management server or set of servers that has access to one or both of the storage arrays 105, from which the MPIO drivers 112 can obtain storage array related information, in addition to or in place of obtaining such information directly from one or both of the storage arrays 105.

Some embodiments are configured to support seamless migration. For example, in PowerPath® Migration Enabler (PPME), and more specifically in PPME-OR, where OR denotes Open Replicator, data of one or more logical storage devices subject to seamless migration is copied from a source array to a target array. Other types of migration, as well as other activities such as backups, can be similarly supported, in addition to synchronous and/or asynchronous replication processes.

In a datacenter or other type of information processing system, storage to host connectivity is usually via one or more SAN fabrics. These SAN fabric configurations can include multiple fabric switches with LUNs made visible to a host through multiple paths based on zone configuration and physical connectivity.

Multi-pathing software residing on the host device (e.g., a server such as an ESXi server or an AIX server) is utilized in illustrative embodiments to facilitate creation of remote backup copies in cases of remote replication. It is more particularly assumed in some embodiments that such multi-pathing software configured as disclosed herein is installed on the hosts and handles load balancing of IO operations across available paths between respective initiator-target pairs. The initiators are assumed to include respective HBAs, and the targets illustratively comprise respective storage array ports.

The host device 102-1 comprising MPIO driver 112-1 is an example of what is more generally referred to herein as a processing device comprising a processor coupled to a memory. Other embodiments can implement distributed backup techniques of the type disclosed herein in other types of processing devices, including host devices or other processing devices that do not include MPIO drivers. Accordingly, it is to be appreciated that references herein to MPIO drivers or multi-path layers performing certain functions are by way of example only, and not intended to be limiting in any way.

In some embodiments, the first storage array 105-1 has direct connection to the host device 102-1 that generates the write requests, but the second storage array 105-2 has no direct connection to the host device 102-1 that generate the write requests. The embodiment of FIG. 1B is an example of such an arrangement.

It is also possible that there may be multiple source storage arrays that are performing replication to a single target storage array. For example, the first storage array 105-1 may be one of a plurality of host-connected source storage arrays having direct connections to one or more of the host devices 102 and the second storage array 105-2 may be a target storage array having no direct connection to the one or more host devices 102 but instead configured to serve as a replication target for each of the plurality of host-connected source storage arrays. Numerous other arrangements of multiple source and target storage arrays are possible in other embodiments.

Although in the present embodiment and other embodiments herein, host devices comprising MPIO drivers are used to facilitate creation of remote backup copies in conjunction with remote replication, this is by way of illustrative example only, and other host device components can alternatively implement at least portions of such distributed backup functionality.

Accordingly, distributed backup functionality in some embodiments can be distributed across multiple host device components, possibly including MPIO drivers in combination with other host device components such as host device processors and associated control logic instances.

Illustrative embodiments provide functionality for distributed backup using local access, with at least portions of that functionality being implemented using a backup application running on one or more of the host devices 102. The backup application illustratively interacts with a database application also running on one or more of the host devices 102. The database application may comprise an SQL database application or another type of database application. Other types of applications can be used in other embodiments.

Backup and restore are examples of operations in which data from a local array is copied to a remote array and then copied back to the local array when needed (e.g., after a failure or other issue on the local array). The copy can be controlled by backup applications such as AppSync. The backup application will order the local array to replicate data to the remote array and create copies of the data on the remote array to leverage various consistency technologies (application based, array based, etc.).

In order to verify that the remote backup is valid (e.g., restartable, consistent, etc.), an administrator ("admin") or other system user can:

1. Mount the copy (on the remote array) to a host device running the backed-up application, and verify that the application considers the data valid. Such an approach requires an additional host device running the application, and operates at a remote site.

2. Restore the copy to a second device on the local array and mount the data to the existing host device and application for backup correctness verification.

Unfortunately, such arrangements generally require an additional host and application license (if verification is done on the remote array) or copying of the data from the remote site to the local site (to use the existing host application for verification).

Illustrative embodiments disclosed herein overcome these and other drawbacks by providing techniques for distributed backup using local access, as will now be described in more detail.

In operation, at least one processing device associated with the host device 102-1 is configured to provision a first logical device on the first storage array 105-1, to configure the first logical device to support replication from the first storage array 105-1 to the second storage array 105-2, and to initiate generation of a remote backup copy of a second logical device on the second storage array 105-2. The at least one processing device associated with the host device 102-1 is further configured, in conjunction with performance of a verification process for the remote backup copy of the second logical device, to cause the first logical device to be paired with the remote backup copy of the second logical device, and to mount the first logical device so as to permit performance of the verification process for the remote backup copy utilizing data obtained from the remote backup copy via the first logical device. The particular ordering of these and other illustrative operations referred to herein is exemplary only, and can be varied in other embodiments.

The above-noted "at least one processing device" illustratively comprises at least a portion of the host device 102-1, or possibly the entire host device 102-1, which in some embodiments is coupled directly to the first storage array 105-1 and coupled indirectly to the second storage array 105-2 via the first storage array 105-2. Numerous other processing device arrangements are possible in other embodiments.

In some embodiments, provisioning the first logical device on the first storage system 105-1 comprises provisioning the first logical device as what is referred to herein as a "storage-less logical device" without associated physical storage on the first storage system 105-1. The term "storage-less logical device" as used herein is intended to be broadly construed, so as to encompass a non-storage logical device or other type of logical device that does not have any physical storage allocated thereto.

Accordingly, in such embodiments, the first logical device is distinct from other logical devices provisioned on the first storage system 105-1, where such other logical devices comprise respective LUNs or other logical storage devices each having provisioned portions of a logical address space of the first storage array 105-1 associated therewith. The first logical device is illustratively configured to include remote replication capabilities in order to support replication from the first storage array 105-1 to the second storage array 105-2.

Initiating generation of a remote backup copy of the second logical device on the second storage array 105-2 illustratively comprises causing a snapshot of the second logical device to be taken on the second storage array 105-2.

Causing the first logical device to be paired with the remote backup copy of the second logical device illustratively comprises creating an RDF pairing between the first logical device and the remote backup copy utilizing remote replication capabilities of the first logical device. Other types of pairings between the first logical device and the remote backup copy supporting remote replication can be used. As indicated previously herein, one example of an RDF pairing is an SRDF pairing supporting at least one of asynchronous and synchronous replication between the first and second storage arrays 105.

Such operations can be performed at least in part under the control of a backup application executing on one or both of the first and second host devices 102-1 and 102-2. For example, in some embodiments, the operations of provisioning the first logical device, configuring the first logical device to support replication, and initiating generation of the remote backup copy are performed by or under control of a backup application running on the first host device 102-1, where that host device also executes a database application. Numerous alternative arrangements of operations associated with distributed backup with local access as disclosed herein are possible. Other host device components can perform at least portions of one or more such operations in other embodiments.

In some embodiments, the first and second logical devices are associated with a particular type of application executing on the first host device 102-1, such as the above-noted database application. It is assumed in one or more embodiments of this type that the database application is not executing on the second host device 102-2, and accordingly executes only on the first host device 102-1.

Additionally or alternatively, in some embodiments, the verification process is performed by a verification tool implemented on the first host device 102-1. It is assumed in one or more embodiments of this type that the verification tool is not available on the second host device 102-2. Under such an assumption, it would generally not be possible to perform the verification process on the second host device 102-2. For example, the verification tool is illustratively part of or otherwise associated with the database application, and can therefore only be executed on a host device that also executes the database application, such as the first host device 102-1 under the above assumption. In some situations, it may not be desirable to execute the database application on both the first and second host devices 102-1 and 102-2, possibly due to additional cost and complexity associated with installing and maintaining the database application and its associated verification tool on both host devices. Such cost and complexity can include, for example, recurring costs associated with additional licenses for utilizing the database application on the second host device 102-2.

The verification process performed by the verification tool implemented on the first host device 102-1 comprises confirming that the remote backup copy is a valid copy by verifying that the remote backup copy is consistent, and additionally or alternatively verifying that the remote backup copy exhibits one or more other specified properties, such as being restartable and/or complete.

Advantageously, the verification process performed by the verification tool implemented on the first host device 102-1 does not require copying all of the data of the remote backup copy from the second storage array 102-2 to the first storage array 105-1.

In some embodiments, such as the embodiment of FIG. 1A, the host device 102-1 has direct connectivity to both the first and second storage arrays 105 via the one or more SANs 104. In arrangements of this type, the host device 102-1 can communicate directly with both of the storage arrays 105.

In other embodiments, such as the embodiment of FIG. 1B, the host device 102-1 has direct connectivity to the first storage array 105-1 but does not have direct connectivity to the second storage array 105-2. In arrangements of this type, the host device 102-1 can communicate directly with the first storage array 105-1, and can communicate indirectly with the second storage array 105-2. Such indirect communication between the host device 102-1 and the second storage array 105-1 can be carried out via the first storage array 105-1, and/or via a centralized server, such as an external server comprising a PPMA or other MPIO management station that is in communication with the MPIO drivers 112 and the storage arrays 105.

As indicated previously, the first and second storage arrays 105 in some embodiments comprise respective distinct production and recovery storage arrays at respective different physical sites. It is to be appreciated that numerous other remote replication arrangements are possible in other embodiments.

In some embodiments, in conjunction with generation of a backup copy, the database application flushes memory buffers and then freezes IO to its corresponding storage array for a certain period. The database illustratively has a predetermined freeze time, and after entering a freeze state the database application automatically exits the freeze state after expiration of the predetermined freeze time. It is assumed without limitation that the backup copy can be generated on the second storage array 105-2 in an amount of time that is less than a maximum freeze time of the database application.

For example, in some embodiments, the database application comprises an SQL database having a designated maximum freeze time. In an arrangement in which the backup application interacts with the database application utilizing one or more application programming interfaces (APIs) configured in accordance with at least one of a Virtual Device Interface (VDI) and a Volume Shadow Copy Service (VSS) configuration, the maximum freeze time may be on the order of 10 seconds. Other maximum freeze times may be present in other types of database applications.

An example algorithm implementing distributed backup techniques of the type described above illustratively includes the following steps:

1. A backup application (e.g., AppSync, ProtectPoint or SymmCLI commands) is used to manage the operations across the host devices 102 and storage arrays 105. In this embodiment, the first storage array 105-1 is assumed to be the local array and the second storage array 105-2 is assumed to be the remote array.

2. The backup application provisions a new type of logical device on the local array. This logical device has remote replication capabilities (e.g., an RDF device) but without any local storage, and is also referred to as a storage-less device. Such a storage-less device is an example of what is more generally referred to herein as a "non-storage logical device."

3. The backup application initiates generation of a remote copy on the remote array using remote snapshot techniques. For example, the backup application illustratively issues a "begin snapshot backup" command to the database (e.g., an SQL database) using appropriate database APIs (e.g., VSS/VDI), which will cause the database to flush memory buffers and then freeze the IOs to the local array. As indicated above, some database applications can only freeze IOs for a limited time (e.g., an SQL database freezes for a maximum of 10 seconds if VSS/VDI is used). Once IOs to the local array are frozen, the database returns a response to the backup application indicating that the database is frozen. The database will subsequently "thaw" (as its freeze time was limited) and resume sending IOs to the local array. It is assumed for illustrative embodiments herein that the remote copy can be created in an amount of time that is less than the maximum freeze time of the database application.

4. The completion of the backup copy creation on the remote array is acknowledged to the backup application, and the backup application generates a notification to an administrator or other user that a backup copy was created on the remote array.

5. Verification of the backup copy on the remote array is performed, for example, by running a database verification tool. In conjunction with such verification, the newly-created device (i.e., the storage-less device on the local array) is associated with the remote copy on the remote array, illustratively by creating an RDF pair between the storage-less device on the source side and the snapshot on the remote side.

6. The storage-less device is mounted on the local array to the database application, which will use its associated verification tool to verify that the data on the storage-less device (effectively the data in the remote backup copy on the remote array) is a valid copy (e.g., consistent, restartable, complete, etc.).

7. Such verification does not require additional storage on the local array side, and does not require copying of all the data from the remote array to the local array. Instead, this embodiment allows remote copies to be created and verified without the need for additional copies on the local array side.

This particular algorithm is presented by way of illustrative example only, and other embodiments can use other types of algorithms to provide the disclosed functionality for distributed backup using local access. The steps of this example algorithm are presented serially above, but one or more such steps can be performed at least partially in parallel with one another. The ordering of the steps of the example algorithm may therefore be varied, and additional or alternative steps may be used.

The above example algorithm advantageously allows a host device to test a database or other set of one or more logical storage volumes without having a local copy available on the local storage array.

This algorithm and other embodiments herein can be used in conjunction with backup of SQL databases and a wide variety of other types of databases that are subject to replication processes, and in a wide variety of other storage contexts.

The above example algorithm advantageously allows consistent remote backup copies to be created and verified without requiring the cost and complexity of obtaining additional database licenses on the second host device 102-2 directly coupled to the second storage array 105-2. For example, a database application and an associated verification tool running on the first host device 102-1 can be used to verify consistency and other properties of a remote backup copy created on the second storage array 105-2.

These and other illustrative embodiments allow for accurate and efficient backup of SQL databases and a wide variety of other types of databases in an efficient and cost-effective manner.

Illustrative embodiments provide significant advantages over conventional practice. For example, the disclosed techniques can facilitate the creation and verification of remote backup copies in situations in which remote hosts do not execute corresponding database applications or verification tools.

Some embodiments involve utilization of a storage array configuration that is referred to herein as a "bunker box." Such a bunker box illustratively comprises a storage array that does not have any hosts directly connected to it, but serves as a remote array relative to one or more arrays that are directly connected to hosts. The bunker box storage array is therefore protected from any directly attached host getting hacked and comprising the data stored in the bunker box storage array. It is common for the bunker box storage array to be relatively under-powered relative to the host-connected storage arrays. For example, an older storage array may be used as the bunker box storage array, as it only processes replication load, and so performance is not as much of an issue as it would be for the host-connected storage arrays. Illustrative embodiments herein can advantageously facilitate creation of remote backup copies in such remote replication arrangements. Similar advantages are provided in numerous other remote replication environments and configurations.

Interactions between the host devices 102 and the storage arrays 105 via the MPIO drivers 112 are illustratively carried out using commands of a standard storage access protocol such as the above-noted SCSI and NVMe access protocols, can be used in other embodiments. Other types of commands such as "vendor unique" or VU commands may be used.

It is to be appreciated that the above-described features of systems 100 and 100' as and other features of other illustrative embodiments are presented by way of example only, and should not be construed as limiting in any way. Accordingly, different numbers, types and arrangements of system components, such as host devices 102, network 104, storage arrays 105, and storage devices 106, as well as various arrangements of additional or alternative components, can be used in other embodiments.

It should also be understood that the particular sets of modules and other components implemented in the systems 100 and 100' as illustrated in FIGS. 1A and 1B are presented by way of example only. In other embodiments, only subsets of these components, or additional or alternative sets of components, may be used, and such components may exhibit alternative functionality and configurations.

The operation of the information processing systems 100 and 100' will now be described in further detail with reference to the flow diagram of the illustrative embodiment of FIG. 2. The process as shown includes steps 200 through 212, and is suitable for use in the systems 100 and 100' but is more generally applicable to other types of systems comprising one or more host devices and at least first and second storage systems. The storage systems in this embodiment are assumed to more particularly comprise respective first and second storage arrays each comprising a plurality of storage devices. The storage devices of the first and second storage arrays are assumed to include logical storage devices such as LUNs or other logical storage volumes.

Figure 2:
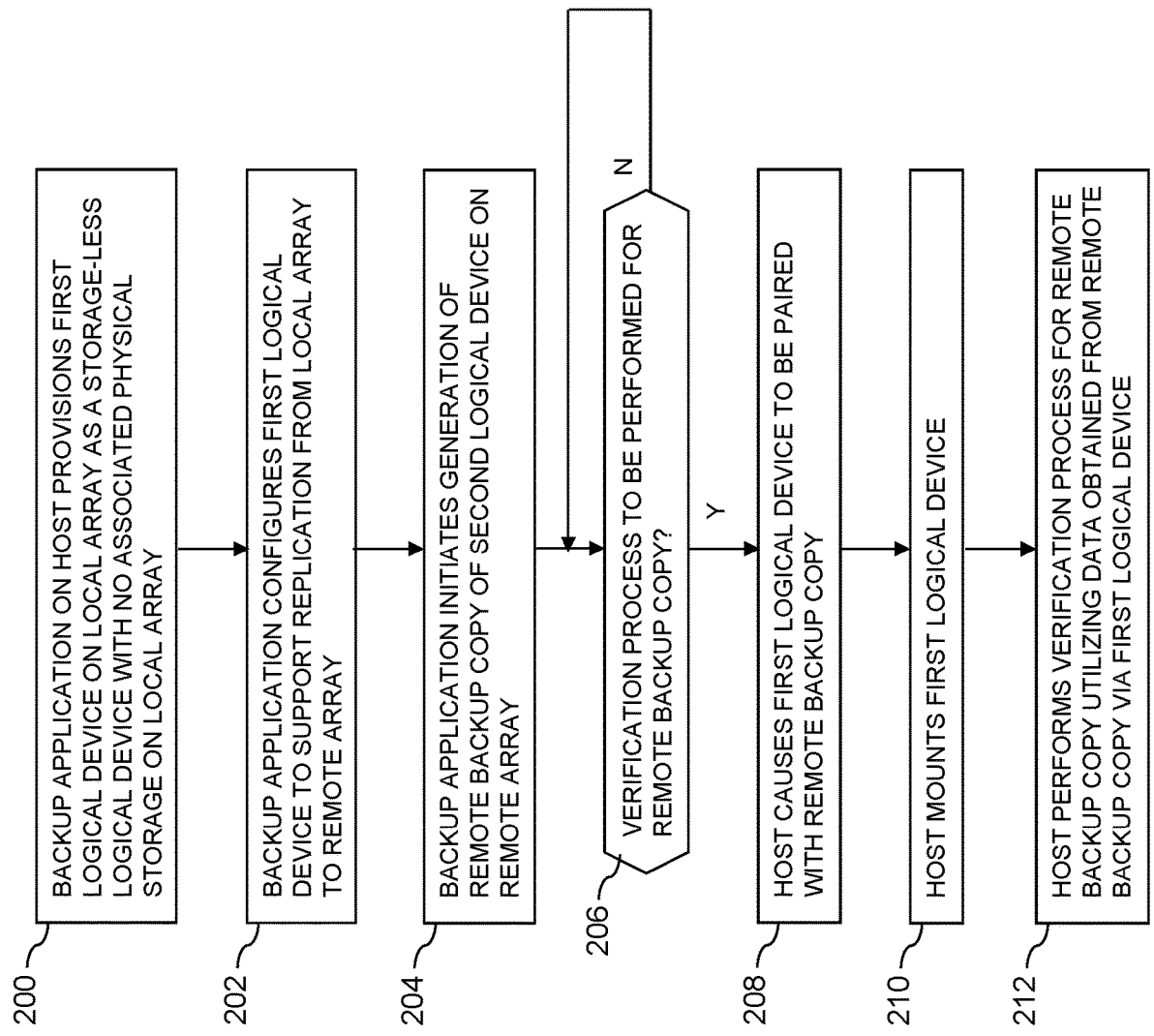
FIG. 2 is a flow diagram of a process for distributed backup using local access in an illustrative embodiment.

The steps of the FIG. 2 process illustratively involve at least one host device and first and second storage arrays, where at least the first storage array has direct connectivity to the at least one host device via a SAN or other network. For example, the first and second storage arrays of the FIG. 2 process illustratively correspond to first and second storage arrays 105-1 and 105-2 where at least the first storage array 105-1 has direct connectivity to at least the first host device 102-1 comprising the MPIO driver 112-1 as illustrated in FIGS. 1A and 1B, although other arrangements of system components can perform at least portions of one or more of the steps of the FIG. 2 process in other embodiments. The functionality of the FIG. 2 process is illustratively performed in conjunction with execution of a backup application on a host device such as host device 102-1.

In step 200, the backup application on the host device provisions a first logical device on the first storage array ("local array") as a storage-less logical device with no associated physical storage on the local array.

In step 202, the backup application on the host device configures the first logical device to support replication from the local array to the second storage array ("remote array").

In step 204, the backup application on the host device initiates generation of a remote backup copy of a second logical device on the remote array. For example, this can involve the backup application issuing a command to a database application also executing on the host device. It is to be appreciated that terms such as "initiate" and "initiating" as used herein with respect to generation of a remote backup copy are to be construed as encompassing commencement of a process for generating such a remote backup copy, and not necessarily the actual generation of the remote backup copy.

In step 206, a determination is made as to whether or not a verification process is to be performed for the remote backup copy. If the verification process is to be performed, the FIG. 2 process moves to step 208, and otherwise waits at step 206 until such time as the verification process is to be performed.

In step 208, the host device causes the first logical device to be paired with the remote backup copy.

In step 210, the host device mounts the first logical device so as to make it accessible to the database application.

In step 212, the host device performs the verification process for the remote backup copy utilizing data obtained from the remote backup copy via the first logical device The various steps of the FIG. 2 process are illustratively shown as being performed serially, but certain steps can at least partially overlap with other steps. For example, performance of step 200 can be substantially continuous during the process, with steps 202 through 212 being performed in parallel with step 200 as needed.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and distributed backup functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different distributed backup arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Referring now to FIG. 3, another illustrative embodiment is shown. In this embodiment, an information processing system 300 comprises application processes 311, path selection logic 314 and replication control logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements distributed backup functionality across first and second storage arrays, illustratively arranged in an asynchronous replication configuration or other replication configuration relative to one another, in a manner similar to that described elsewhere herein. The application processes 311 are illustratively running in one or more host device processors of the host device processor layer 330. The distributed backup functionality in this embodiment is assumed to be controlled at least in part by one or more backup application processes that are part of the application processes 311 executed by one of more host device processors of the host device processor layer 330. The application processes 311 further include one or more processes of a database application. Such a database application illustratively has an associated verification tool that can be used to perform a verification process on a remote backup copy in the system 300, as previously described herein.

The backup application via its associated processes in the application processes 311 implements an algorithm comprising steps that illustratively include at least a subset of the steps 202 through 212 of the FIG. 2 distributed backup process. For example, at least steps 200 through 204, and possibly at least portions of one or more additional steps, are assumed to be performed by the backup application.

The MPIO layer 332 is an example of what is also referred to herein as a multi-path layer, and comprises one or more MPIO drivers implemented in respective host devices. Each such MPIO driver illustratively comprises an instance of path selection logic 314 configured to implement functionality for delivering write requests and other IO operations over multiple paths between the host devices and the storage arrays as previously described. For example, such IO operations are illustratively directed to one or more logical storage devices of a first storage array that are subject to remote replication to a second storage array, as described in more detail elsewhere herein. Additional or alternative layers and path selection logic arrangements can be used in other embodiments.

The replication control logic 321 implemented in the storage array processor layer 340 controls the asynchronous replication configuration of a given pair of storage arrays, or other types of replication arrangements implemented in the system 300. For example, the replication control logic 321 can include functionality for carrying out an asynchronous replication process between first and second storage arrays. It is also possible in some embodiments that the replication control logic 321 can include multiple distinct replication control logic instances for respective ones of a plurality of storage arrays of the system 300. Other types of replication, such as synchronous replication in an active-active configuration of the storage arrays, can also be supported in system 300. Although not explicitly shown in the figure, additional replication control logic is illustratively implemented in the host device processor layer 330, or elsewhere in the system 300, such as in the MPIO layer 332.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a particular number and type of paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

The host devices of system 300 through their respective MPIO drivers and respective instances of path selection logic 314 interact with at least one storage array to provide functionality for distributed backup using local access. Such functionality illustratively involves multiple storage arrays and at least one host device.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Different instances of the above-described distributed backup process can involve different backup applications in different host devices.

Some embodiments include only a single host device, although multiple host devices are used in illustrative embodiments. For example, a single host device can be connected to two storage arrays that are configured for remote replication.

Also, it should be noted that other arrangements of multiple host devices can be used. For example, multiple host devices in illustrative embodiments can be arranged in a cluster and the host devices can be arranged in active-passive configurations, active-active configurations, or combinations thereof.

The particular distributed backup arrangements described above are presented by way of illustrative example only. Numerous alternative arrangements of these and other features can be used in implementing distributed backup in other embodiments.

The illustrative embodiments disclosed herein can provide a number of significant advantages relative to conventional arrangements.

For example, some embodiments facilitate the creation and verification of remote backup copies on remote storage arrays in situations in which remote hosts directly coupled to the remote storage arrays do not execute database applications or associated verification tools. However, illustrative embodiments are not limited to use with database applications.

The disclosed techniques allow consistent remote backup copies to be generated in these and other remote replication arrangements.

These and other illustrative embodiments allow for accurate and efficient backup of SQL databases and a wide variety of other types of databases or applications for which remote backup copies are generated.

In some embodiments, at least a portion of the distributed backup functionality is implemented in at least one host device that communicates with multiple storage arrays or other types of storage systems.

The disclosed functionality can be implemented using a wide variety of types of host devices each configured to interact with multiple distinct storage arrays or other types of storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the systems 100 and 100'. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell Technologies.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, and additional or alternative components. Also, the particular configurations of system and device elements and associated processing operations illustratively shown in the drawings can be varied in other embodiments. For example, a wide variety of different host device configurations and associated distributed backup arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   at least one processing device comprising a processor coupled to a memory;
   wherein the at least one processing device is configured:
   to provision a first logical device on a first storage system;
   to configure the first logical device to support replication from the first storage system to a second storage system;
   to initiate generation of a remote backup copy of a second logical device on the second storage system;
   in conjunction with performance of a verification process for the remote backup copy of the second logical device, to cause the first logical device to be paired with the remote backup copy of the second logical device; and
   to mount the first logical device so as to permit performance of the verification process for the remote backup copy utilizing data obtained from the remote backup copy via the first logical device;
   wherein said at least one processing device comprises at least a portion of a host device coupled to one or both of the first and second storage systems via at least one network;
   wherein the verification process is performed by a verification tool implemented on the host device; and
   wherein the verification process performed by the verification tool implemented on the host device does not copy all of the data of the remote backup copy from the second storage system to the first storage system.

2. The apparatus of claim 1 wherein the first and second storage systems comprise respective distinct storage arrays at respective different physical sites.

3. The apparatus of claim 1 wherein provisioning the first logical device on the first storage system comprises provisioning the first logical device as a storage-less logical device without associated physical storage on the first storage system.

4. The apparatus of claim 1 wherein configuring the first logical device to support replication from the first storage system to a second storage system comprises configuring the first logical device to include remote replication capabilities.

5. The apparatus of claim 1 wherein initiating generation of a remote backup copy of the second logical device on the second storage system comprises causing a snapshot of the second logical device to be taken on the second storage system.

6. The apparatus of claim 1 wherein the verification process performed by the verification tool implemented on the host device comprises confirming that the remote backup copy is a valid copy by verifying that the remote backup copy is at least one of restartable and consistent.

7. The apparatus of claim 1 wherein causing the first logical device to be paired with the remote backup copy of the second logical device comprises creating a remote data facility pairing between the first logical device and the remote backup copy utilizing remote replication capabilities of the first logical device.

8. The apparatus of claim 1 wherein the first and second logical devices are associated with a particular type of application executing on the host device.

9. The apparatus of claim 8 wherein the particular type of application comprises a database application.

10. The apparatus of claim 1 wherein at least a subset of provisioning the first logical device, configuring the first logical device to support replication, initiating generation of the remote backup copy, causing the first logical device to be paired with the remote backup copy, and mounting the first logical device are performed by or under control of a backup application running on the host device.

11. The apparatus of claim 10 wherein the backup application interacts with a database application utilizing one or more application programming interfaces (APIs) configured in accordance with at least one of a Virtual Device Interface (VDI) and a Volume Shadow Copy Service (VSS) configuration.

12. A computer program product comprising a non-transitory processor-readable storage medium having stored therein program code of one or more software programs, wherein the program code, when executed by at least one processing device comprising a processor coupled to a memory, causes the at least one processing device:
to provision a first logical device on a first storage system;
to configure the first logical device to support replication from the first storage system to a second storage system;
to initiate generation of a remote backup copy of a second logical device on the second storage system;
in conjunction with performance of a verification process for the remote backup copy of the second logical device, to cause the first logical device to be paired with the remote backup copy of the second logical device; and
to mount the first logical device so as to permit performance of the verification process for the remote backup copy utilizing data obtained from the remote backup copy via the first logical device;
wherein said at least one processing device comprises at least a portion of a host device coupled to one or both of the first and second storage systems via at least one network;
wherein the verification process is performed by a verification tool implemented on the host device; and
wherein the verification process performed by the verification tool implemented on the host device does not copy all of the data of the remote backup copy from the second storage system to the first storage system.

13. The computer program product of claim 12 wherein provisioning the first logical device on the first storage system comprises provisioning the first logical device as a storage-less logical device without associated physical storage on the first storage system.

14. The computer program product of claim 12 wherein causing the first logical device to be paired with the remote backup copy of the second logical device comprises creating a remote data facility pairing between the first logical device and the remote backup copy utilizing remote replication capabilities of the first logical device.

15. A method comprising:
provisioning a first logical device on a first storage system;
configuring the first logical device to support replication from the first storage system to a second storage system;
initiating generation of a remote backup copy of a second logical device on the second storage system;
in conjunction with performance of a verification process for the remote backup copy of the second logical device, causing the first logical device to be paired with the remote backup copy of the second logical device; and
mounting the first logical device so as to permit performance of the verification process for the remote backup copy utilizing data obtained from the remote backup copy via the first logical device;
wherein the method is performed by at least one processing device comprising a processor coupled to a memory;
wherein said at least one processing device comprises at least a portion of a host device coupled to one or both of the first and second storage systems via at least one network;
wherein the verification process is performed by a verification tool implemented on the host device; and
wherein the verification process performed by the verification tool implemented on the host device does not copy all of the data of the remote backup copy from the second storage system to the first storage system.

16. The method of claim 15 wherein provisioning the first logical device on the first storage system comprises provisioning the first logical device as a storage-less logical device without associated physical storage on the first storage system.

17. The method of claim 15 wherein causing the first logical device to be paired with the remote backup copy of the second logical device comprises creating a remote data facility pairing between the first logical device and the remote backup copy utilizing remote replication capabilities of the first logical device.

18. The method of claim 15 wherein the first and second logical devices are associated with a particular type of application executing on the host device.

19. The method of claim 18 wherein the particular type of application comprises a database application.

20. The method of claim 15 wherein at least a subset of provisioning the first logical device, configuring the first logical device to support replication, initiating generation of the remote backup copy, causing the first logical device to be paired with the remote backup copy, and mounting the first logical device are performed by or under control of a backup application running on the host device.

* * * * *